United States Patent [19]

Uchidoi et al.

[11] 4,203,660
[45] May 20, 1980

[54] AUTOMATIC EXPOSURE CONTROL SYSTEM FOR SINGLE REFLEX CAMERA

[75] Inventors: Masanori Uchidoi, Kawasaki; Tokuichi Tsunekawa, Yokohama; Hiroshi Aizawa, Machida; Tetsuya Taguchi, Kawasaki; Tadashi Ito, Yokohama; Yoshiyuki Takishima, Machida, all of Japan

[73] Assignee: Canon Kabushiki Kaisha, Tokyo, Japan

[21] Appl. No.: 904,819

[22] Filed: May 11, 1978

Related U.S. Application Data

[63] Continuation of Ser. No. 718,586, Aug. 30, 1976, abandoned, which is a continuation of Ser. No. 569,757, Apr. 21, 1975, abandoned.

[30] Foreign Application Priority Data

| Apr. 22, 1974 [JP] | Japan | 49-45279 |
| Apr. 22, 1974 [JP] | Japan | 49-45280 |
| Apr. 22, 1974 [JP] | Japan | 49-45281 |
| Apr. 22, 1974 [JP] | Japan | 49-45282 |
| Jun. 27, 1974 [JP] | Japan | 49-73643 |

[51] Int. Cl.² ............................................. G03B 7/00
[52] U.S. Cl. ...................................... 354/31; 354/59
[58] Field of Search ................ 354/29, 31, 36, 38, 354/40, 43, 53, 56, 60 R, 60 E, 60 L, 234, 238, 268, 59

[56] References Cited

U.S. PATENT DOCUMENTS

| 3,310,679 | 3/1967 | Babish | 354/31 X |
| 3,526,183 | 9/1970 | Hartl | 354/238 |
| 3,605,590 | 9/1971 | Kitai | 354/60 L |
| 3,641,902 | 2/1972 | Kikuchi et al. | 354/234 |
| 3,693,527 | 9/1972 | Matsuda | 354/60 L |
| 3,745,902 | 7/1973 | Taguchi | 354/38 X |
| 3,812,499 | 5/1974 | Hayashi et al. | 354/31 |
| 3,829,867 | 8/1974 | Ono | 354/29 X |

Primary Examiner—Michael L. Gellner
Attorney, Agent, or Firm—Toren, McGeady and Stanger

[57] ABSTRACT

A camera which permits change-over between different light measuring systems is disclosed. The camera includes a first light measuring element which measures light coming from an object to be photographed and an operational amplifier responsive to the element. A light measurement information producing circuit is included for producing a light measurement information signal for exposure computation. A change-over device is connected between the light measurement information producing circuit and the operational amplifier. The change-over device is arranged to be shiftable between a first position wherein the operational amplifier is connected to the light measurement information producing circuit and a second position wherein the operational amplifier is not so connected. An accessory device is attachable to the camera body. The accessory device includes a second light receiving element for measuring light from the object within a light measurement range different from that of the first light receiving element and another operational amplifier responsive thereto. A terminal is responsive to the signal from the latter operational amplifier. The terminal is disposed at the second position of the change-over device so that the signal from the latter operation is applied to the light measurement information producing circuit when the change-over device is in this position.

4 Claims, 5 Drawing Figures

AUTOMATIC EXPOSURE CONTROL SYSTEM FOR SINGLE REFLEX CAMERA

This is a continuation of application Ser. No. 718,586, filed Aug. 30, 1976, which in turn is a continuation of application Ser. No. 569,757, filed Apr. 21, 1975, both now abandoned.

BACKGROUND OF THE INVENTION

1. Field of the Invention

The present invention relates to an exposure control system for a single reflex camera for controlling the current supply to each circuit in the camera.

2. Description of the Prior Art

Generally, the automatic exposure control system of a camera with electric shutter consists of many circuits such as a light sensing and processing circuit, a storage circuit, an exposure determining circuit, a shutter actuating circuit, a shutter time control circuit and an indication circuit to which the current is supplied from small cells set inside of the camera, whereby a current supply system for minimizing the power consumption in each circuit is needed in order to prolong the life of the cells.

However, the conventional current supply system is constructed in such a manner that the current is supplied to each circuit by the shutter operation in the self-held state while the internal mechanisms are operated one by one. Then, when the rear plane of the focal plane shutter runs, the self-held state is released in such a manner that the current supply to each circuit is interrupted. Thus, during the operation of the camera, the current continues to be always supplied to each circuit so that the life of cells is very short.

The first purpose of the present invention is to eliminate the above mentioned shortcoming in such a manner that the current supply to each circuit in a camera will be controlled efficiently.

The second purpose of the present invention is to actuate the electric shutter electro-magnetically.

The third purpose of the present invention is to adopt the mean light sensing and the partial light sensing which can be switched over selectively.

The fourth purpose of the present invention will be disclosed in accordance with the explanation of the embodiments below.

DESCRIPTION OF THE PREFERRED EMBODIMENTS

Figure 1:
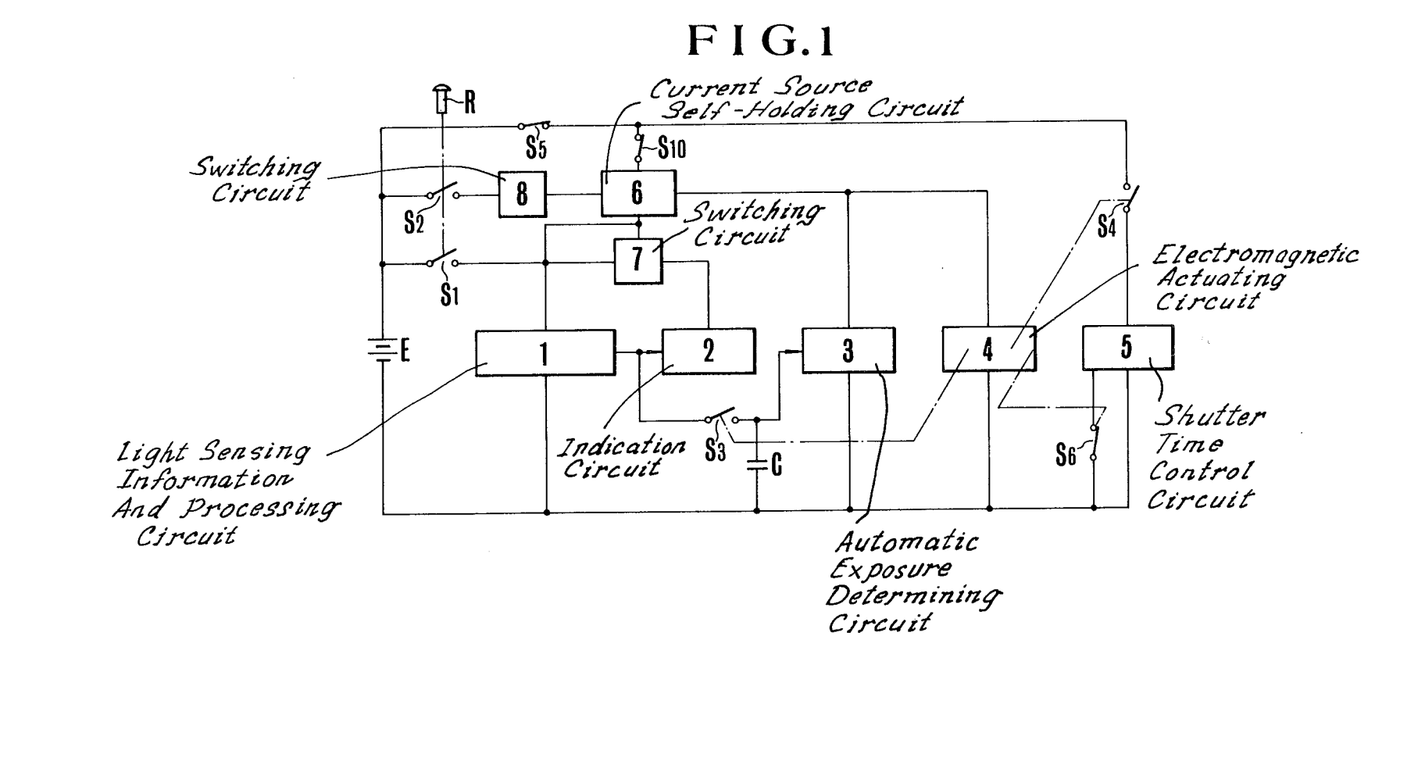
FIG. 1 shows a system diagram of a circuit of an embodiment of the exposure control device in accordance with the present invention.

The present invention will be explained in accordance with the accompanying drawings. FIG. 1 shows a circuit system diagram of an embodiment of the current supply system in accordance with the present invention. The drawing shows an example adapted to a camera with an electric shutter of storage system. In the drawing, E is the current source, $S_1$ and $S_2$ are the switches in functional engagement with the shutter release button, $S_3$ the switch for storage, C the condensor for storage, $S_4$ the switch for the shutter time control circuit, $S_5$ and $S_{10}$ the normally closed switches which close at the termination of the winding up. 1 is the light sensing, information setting and processing circuit and 2 the indication circuit, whereby both are brought into the operation state when the switch $S_1$ closes. 3 is the automatic exposure determining circuit which acts as diaphragm value determining circuit, when the priority is given to the shutter time. 4 is the electro-magnetic actuating circuit for releasing the set front plane of the focal plane shutter, 5 the shutter time control circuit. 6 is the current source self-holding circuit, 7 and 8 the switching circuits. The circuit shown in FIG. 1 operates in such a manner that the switches $S_5$ and $S_{10}$ are closed when the film and shutter winding up in the camera has finished. When the shutter-button R is pushed down to the first step in the above mentioned state, the switch $S_1$ is closed by means of the stroke. When the switch $S_1$ is closed, the applied voltage of the electric source E brings the light sensing, information setting and processing circuit 1 into the operation state, whereby the circuit 1 produces the exposure information, for example the diaphragm value information processed in Apex value so as to charge the storage condensor, because at this time, the storage switch $S_3$ is closed. When the switch $S_1$ is closed, the switching circuit 7 is brought into the conductive state in such a manner that the current is supplied to the indication circuit 2, namely the information coming from the circuit 1 is indicated in the indication circuit 2. Further, the indication circuit comprises an alarm circuit for giving an alarm when the photographing information lies beyond the limit of the AE operation range, whereby a means which brings the electro-magnetic actuation out of the operation in accordance with the signal coming from the alarm circuit is provided. Then, by means of the second stroke of the shutter button, the switch $S_2$ is closed. Thus, the switching circuit 8 is closed and kept in the self-held state in such a manner that the AE determining circuit 3 and the electro-magnetic circuit 4 are brought into the operation state so as to release the setting of the front plane of the focal plane shutter. In this manner, before the upward movement of the reflection mirror, the storage switch $S_3$ is opened, while by means of the upward movement, the switch $S_4$ of the shutter time control circuit is closed. When the circuit 6 is brought into the self-held state, by means of the signal coming from the circuit, the switching circuit 7 is opened so as to bring the indication circuit out of operation whereby the indication is put out. By means of the diaphragm information stored in C before the upward movement of the mirror the diaphragm value (AE) determining circuit 3 determines the diaphragm value automatically, which value is kept in the balanced state of the circuit 3. When the diaphragm value is determined by means of the circuit 3 and the upward movement of the mirror is finished, the electro-magnetic actuating circuit 4 is inversed in such a manner that, by means of its output, the trigger switch $S_6$ of the shutter time control circuit is opened. Thus the front plane of the focal plane shutter starts to run. After the shutter time set in advance in the CR circuit 5, the rear plane of the focal plane shutter is released by means of the output of the CR circuit 5 in such a manner that the rear plane of the focal plane shutter starts to run so as to complete the exposure. The already closed switch $S_{10}$ is opened at the termination of the operation of the front plane of the focal plane shutter, while the switch $S_5$ is opened when the rear plane of the focal plane shutter starts to run. When the switches $S_2$ and $S_{10}$ are opened, the self-holding circuit 6 is released. Because the switching circuit 7 is closed when the circuit 6 is opened, the current supply is interrupted only during the operation of the focal plane shutter when the self-holding circuit 6 is closed at the closed state of the indication circuit $S_2$. While before and after the operation of the shutter, the current is supplied. When the shutter and the film are wound up after the termination of the first photographing, the initial state is restored again.

Figure 2:
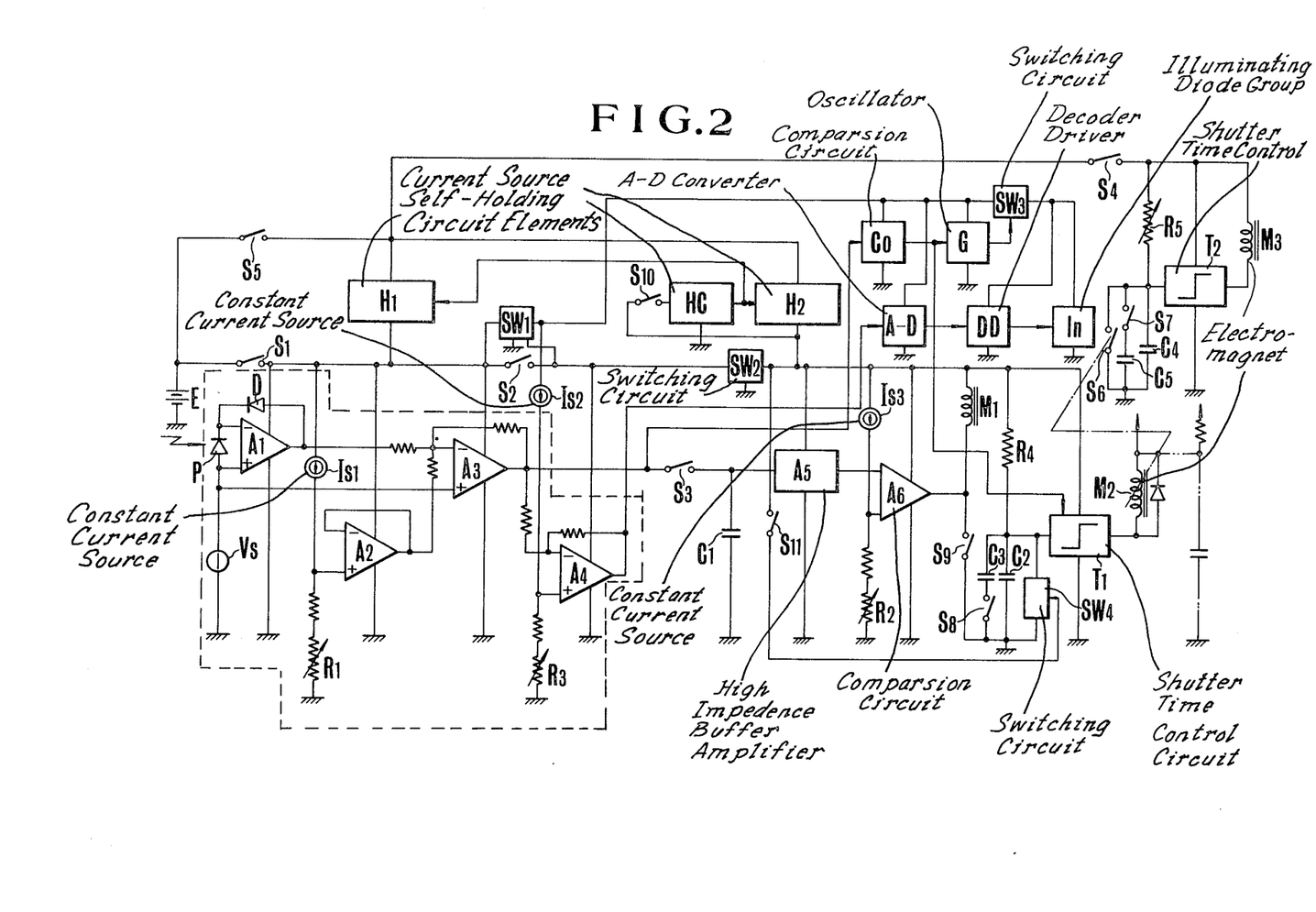
FIG. 2 shows a concrete circuit diagram of FIG. 1.

FIG. 2 shows the circuit of FIG. 1 concretely, whereby in the circuit the switches $S_1$ and $S_2$, in functional engagement with the shutter button, are arranged in series with each other. In the drawing, P is the photoelectric converting element such as a silicon photo diode whose light responsive characteristics is superior, whereby the element is arranged at the proper position in the view finder optical system or the like. $A_1$ is the processing amplifier between whose two input terminals the photodiode P is connected while in the feed back circuit a logarithmic diode is inserted. To the (+) input terminal of the processing amplifier $A_1$, a bias of a constant voltage is applied from a constant voltage source Vs. This amplifier for the light sensing circuit acts as a kind of impedance converting circuit presenting a high input impedance and low output impedance, which is the characteristic of a processing amplifier. The overall characteristic between the input and the output is the logarithmic characteristic so that the logarithmically compressed value of the input signal, namely the Apex value in the photography, is produced at the output. In the circuit shown in the drawing, the output of $A_1$ is an Apex value, namely the value (Bv−Avo), determined by the brightness of the object to be photographed, the F value of the photographic lens at the time of the light sensing. When the light sensing is made by a completely opened lens, the deviation Avc of the F-value due to the curve characteristics at the lens opening is involved so that the output of $A_1$ assumes the value Bv−(Avo+Avc). Then, to the input of the buffer amplifier $A_2$ composing the photographic information setting circuit, various types of photographic information set at the variable resistance $R_1$, through which a constant current flows from a constant current source $Is_1$, are given and converted by the impedance of $A_2$ into the Apex value of the photographic informations at the amplifier output. Namely, when the priority is given to the shutter time, the film sensitivity, the shutter time and the compensation value for the deviation of F value due to the curve characteristics at the lens opening are set while the signal (Sv−Tv+Avc) is produced at the output.

The output of $A_1$ and that of $A_2$ are composed and put in the processing amplifier $A_3$. $A_3$ is the amplifier presenting the inversing efficiency, while to the (+) input terminal a constant bias voltage is applied from Vs. At the output of $A_3$, the diaphragm value processed out of the above mentioned signal is produced. Namely, the output of $A_3$ assumes the value −(Bv+Sv−Tv−Avo) whereby the output of $A_3$ assumes the value −(Av−Avo) because Bv+Sv−Tv is equal to Av.

This value corresponds to the number of steps with which, during photography, the diaphragm of the lens is closed from the F-value of the fully opened lens. Namely, a proper exposure value is reached when the lens is closed with this number of steps from the fully opened state. The output of the processing amplifer −−(Av−Avo) is stored in the stored condensor $C_1$ through the storage switch $S_3$. The output of $A_3$ is put in the (−) input terminal of the processing amplifier $A_4$, while to the (+) input terminal, the voltage of a variable condensor $R_3$ through which a constant current flows from a constant current source is applied. A signal showing the F-value of the fully opened photographic lens is set on $R_3$, while at the output of $A_4$ the difference between the value −(Av−Avo) and the F-value information Avo, namely Av is produced. This value is the absolute value of the actual diaphragm value of the photographic lens at taking picture. Therefore, when this value is indicated in the view finder by means of some proper device, it is possible to know the diaphragm value in advance before the operation of shutter. In the case of the camera shown in the drawing, the above value is indicated digitally. The output of the compensation circuit of the F-value is analog information, which is converted into digital information by means of the A-D converter. The output of the A-D converter is put in the decoder driver DD to be decoded so as to illuminate the illuminating diode group In comprising seven segments. Namely by means of the LED element group of a plural number of positions arranged in the view finder, the diaphragm value for the proper exposure is indicated in letters or figures. In order to minimize the power consumption needed for the indication, the current supply to the indication circuit can be partially interrupted as is shown in FIG. 1 when the output of $A_3$ is not necessary (for example, during the operation of shutter). Namely, the current is supplied to the indication circuit by means of the switching circuit $Sw_1$, whereby $Sw_1$ is closed by means of the first stroke of the shutter button and opened by means of the second stroke. Namely, the indication is extinguished during the shutter operation while even after the termination of the exposure the indication is visible. An alarm circuit is provided in such a manner that the output of $A_3$ is supplied to the comparison circuit Co so as to be compared with the limit value of the automatic exposure control of the camera and an alarm is made when the output is beyond the limit value. Namely by controlling the oscillator G by means of the comparison circuit Co and further controlling the switching circuit $Sw_5$ by means of the output of G, the limit F-value of the indication LED is lighted and extinguished repeatedly so as to indicate that the value is beyond the limit. Hereby when in accordance with the necessity LED is directly driven by means of the output of the oscillator G, the indication LED is lighted and distinguished repeatedly.

Further, the output of the comparison circuit Co is applied to the electro-magnetic actuating circuit in such a manner that by bringing the electro-magnetic actuating circuit out of operation when Co produces an output the shutter time control circuit is brought out of the operation so as to stop the exposure beyond the limit of the AE operation.

$R_4$ and $C_2$ compose the time constant circuit of the electro-magnetic actuating circuit whose time constant is chosen in such a manner that in case of the normal photographing the inversion is made in a very short time after the closing of the switch $S_2$. By means of the electromagnet $M_2$ of this circuit the trigger switch $S_6$ of the shutter time control circuit is opened whereby the shutter time control circuit $T_2$ is inversed with the shutter time set in advance on $R_5$ in such a manner that by means of $M_3$ the rear plane of the focal plane shutter starts to run so as to complete the exposure. Hereby in case of photographing by using a self-timer it is sufficient to attach a delay condensor $C_3$ to the electromagnetic circuit while $S_8$ is closed in such a manner that the shutter actuating time is delayed. The capacity of the condensors to be charged through the resistance by closing the switch $S_8$ becomes $C_2+C_3$, whereby when $C_3$ is chosen sufficiently large it is possible to obtain a self-timer time as long as about 10 seconds. In this way, the operation of the shutter time control circuit driven by means of the electromagnet $M_2$ can be automatically delayed by the self-timer time. Hereby $C_5$ and $S_7$ of the shutter time control circuit is the condensor respectively the switch for the long time exposure, whereby by closing $S_7$ the shutter time can be prolonged (for example 2–30 seconds).

Further, in order to reset the electromagnetic circuit, it is sufficient to bring the switching circuit $Sw_4$ connected parallel to $C_2$ into the conductive state by closing the switch $S_{11}$ and to discharge the charge remaining in $C_2$ and $C_3$.

The voltage corresponding to the information of the number of steps of the diaphragm stored in the condensor $C_1$ of the storage circuit is put in the high input impedance buffer amplifier $A_5$ and kept even if the switch $S_3$ is opened. The output of $A_5$ is put in the comparison circuit $A_6$ so as to be compared with the voltage applied to the other input terminal, of the variable resistance $R_2$ through which a constant current supplied from the constant current source $IS_2$. When the input voltages of $A_6$ become equal to each other by the variation of the value of resistance $R_2$ in functional engagement with the diaphragm mechanism, the electromagnet $M_1$ is driven by means of the output of $A_6$, so as to determine the diaphragm value producing a proper exposure. Thus when at taking photograph the lens is set at this diaphragm value and the shutter is operated with the predetermined shutter time, the proper exposure can be automatically obtained. Hereby the switch $S_9$ is the auto-manual switching over switch which is closed when the diaphragm is manually set.

Figure 3:
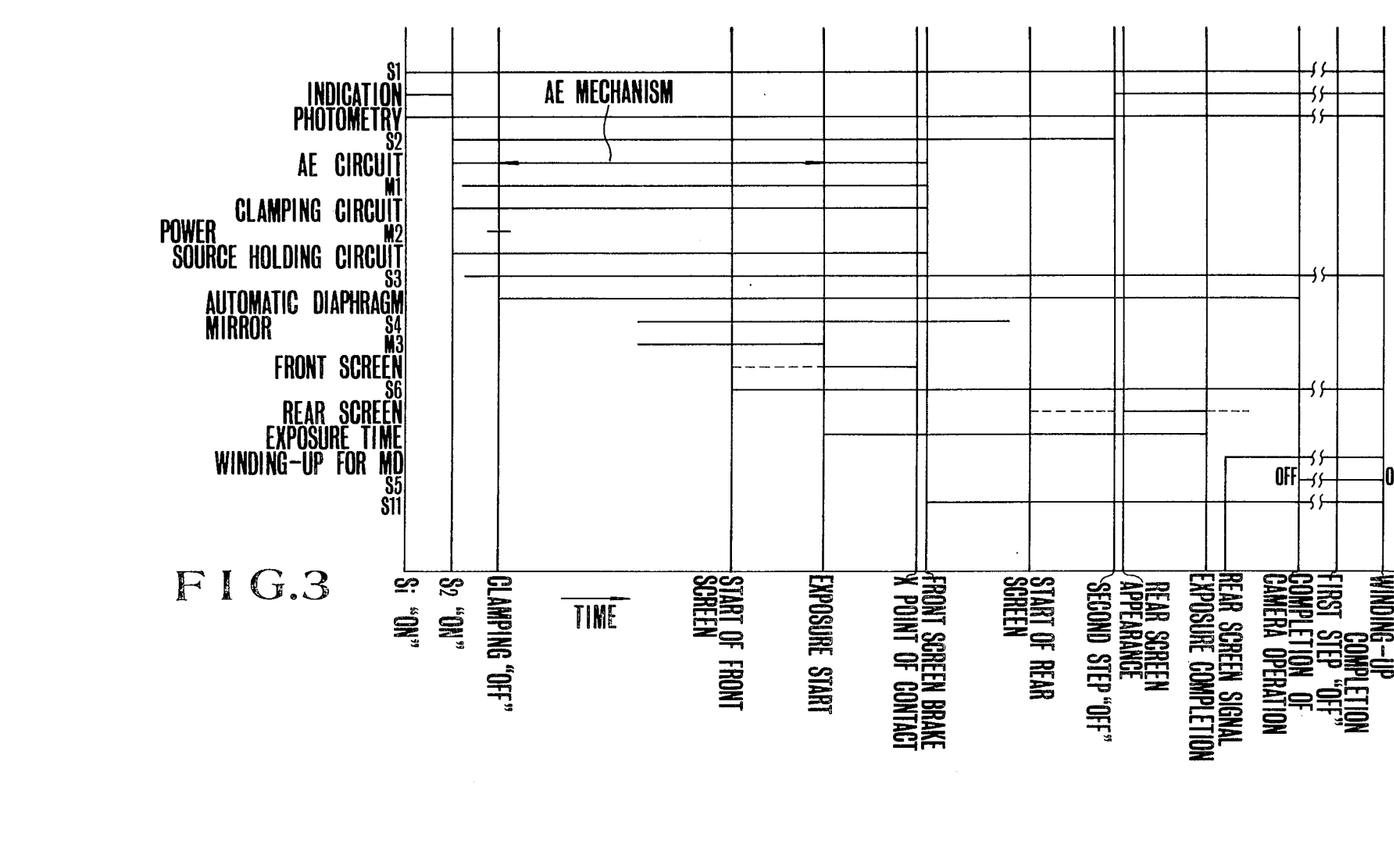
FIG. 3 shows a timing chart showing the operation of each part of the circuit of FIG. 2.

FIG. 3 shows an example of the timing chart showing the operation of every parts of the camera in an embodiment of FIG. 2. In the drawing the abscissa shows the time, the lines drawn alng the abscissa shows the operation time of every circuit or the time during which each switch is closed. As is shown in the drawing, the operating time of the indication circuit as well as the electromagnet whose power consumption is large are chosen as short as possible.

As explained above, by means of the exposure control system in accordance with the present invention an automatic exposure control with priority on shutter time can be made with the electric shutter. Further, it is possible to supply current to every part composing the electrical circuit of the camera efficiently and at the proper time whereby by means of the electromagnetic activating circuit the shutter time control circuit can be electromagnetically actuated with high accuracy while this circuit can be utilized for setting the timer time at taking photograph with self timer.

Figure 4:
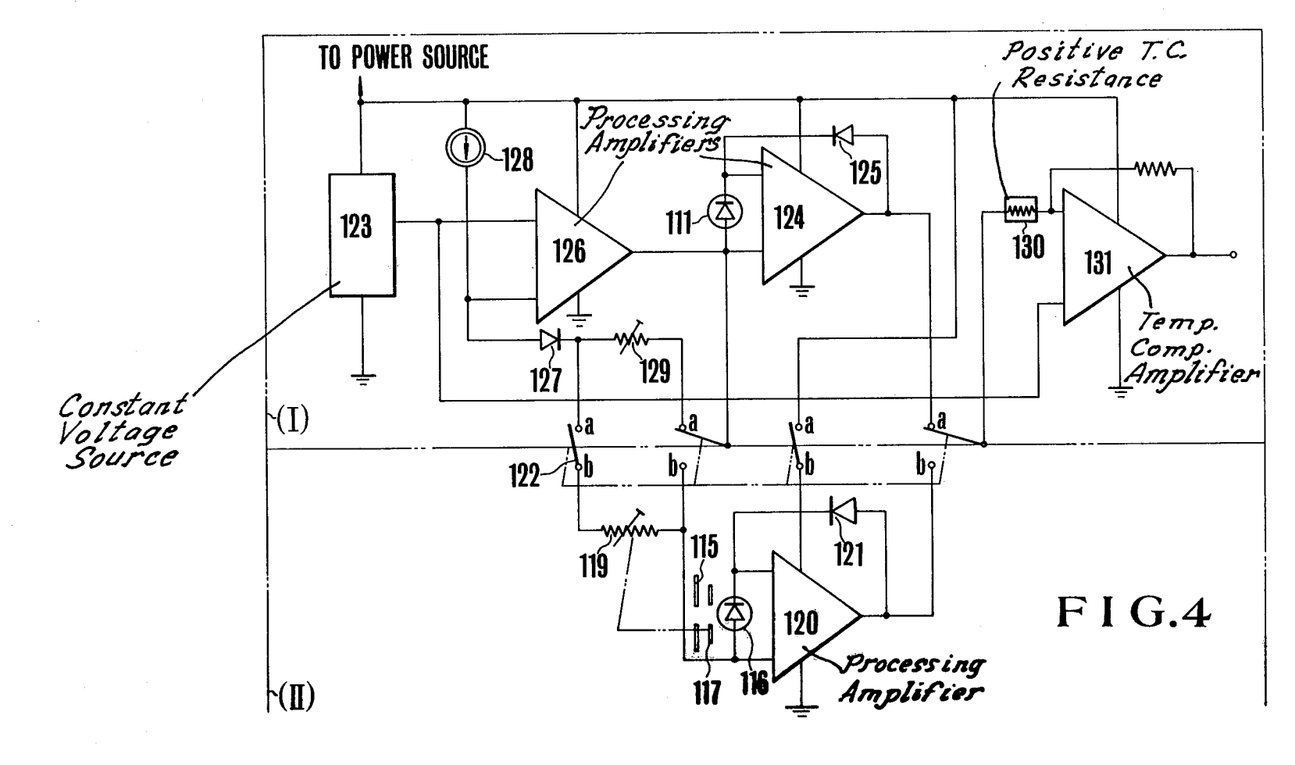
FIG. 4 shows a variation of the light sensing circuit shown in FIG. 2.
Figure 5:
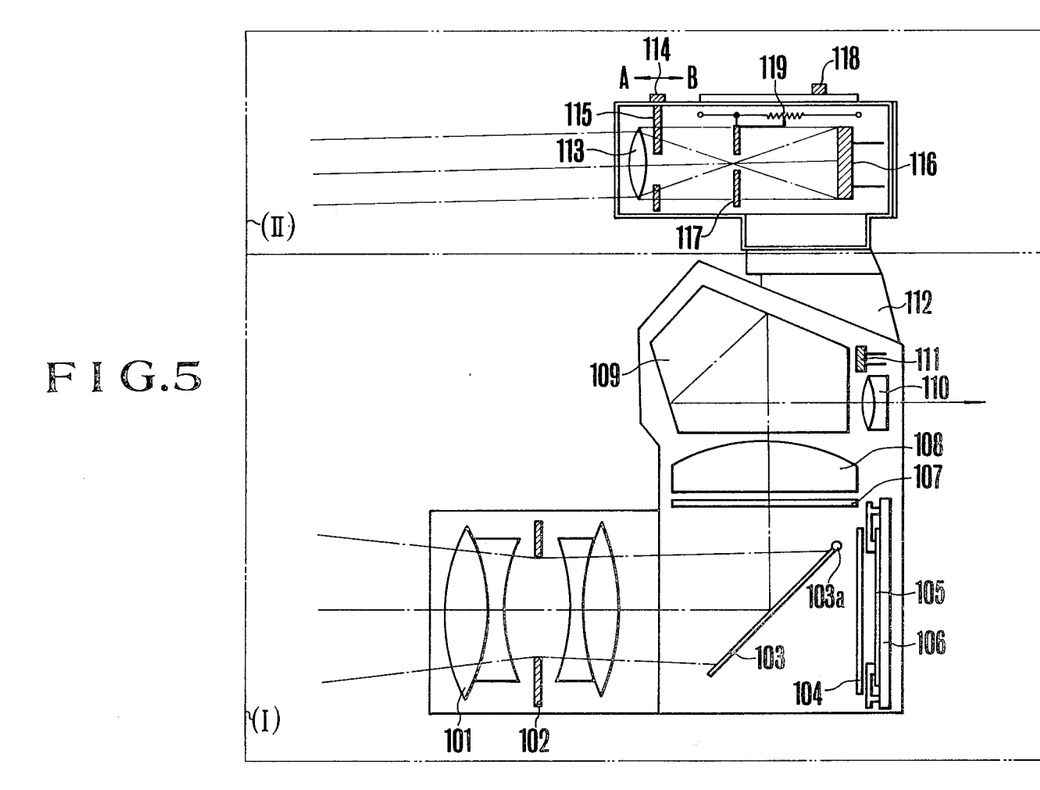
FIG. 5 shows the arrangement of the light sensing element shown in FIG. 4.

The light sensing circuit shown inside of the dotted line in FIG. 2 can be composed in such a manner that the mean light sensing and the partial light sensing can be switched over as is shown in FIG. 4. Namely the part in the dotted line (I) shows the camera unit presenting the mean light sensing means, while the part in the dotted line (II) shows the partial light sensing unit. 115 is the diaphragm member for controlling the amount of the light beam coming from the object to be photgraphed in accordance with the set amount of the set lever 114 to be explained later, 116 the light sensing element such as cds, SBC and so on for measuring the mean brightness at the central part of the photographic field. 117 is the diaphragm for varying the view angle, 118 the view angle varying lever for varying the opening angle of the diaphragm, 119 the resistance being in functional engagement with the diaphragm member 117 and assuming the resistance value in accordance with the variation angle of the view angle so as to automatically compensate the exposure level error when the view angle is varied. 120 is the processing amplifier for amplifying the output of the light sensing element 116, 121 the diode for logarithmically compressing the photo current of the light sensing element 116, 122 the switch for switching over the light sensing systems whereby in the drawing the state in which the mean light sensing circuit at the camera side is chosen is shown. 123 is the constant voltage source for setting the operation level setting of the processing amplifier 126, 124 the processing amplifier for amplifying the output of the light sensing element 111, 125 the diode for logarithmically compressing the photo current of the light sensing element 111, 126 the processing amplifier, 127 the diode for temperature compensation, 128 the constant current source for applying the bias voltage to the temperature compensating diode 127, 129 the variable resistance for adjusting the output level of the light sensing circuit (I) and 130 the resistance with a positive temperature co-efficient. 131 is the temperature compensating amplifier whose output is put in the processing amplifier $A_3$ shown in FIG. 2. The light sensing element 11 and 16 of such a light sensing circuit are arranged as shown in FIG. 5. Namely the part in the dotted line (I) shows the camera unit presenting the mean light sensing member, while the part in the dotted line (II) shows the partial light sensing member. In the drawing 101 is the photographic lens optical system, 102 the diaphragm, 103 the reflecting mirror provided slantly in the photographic optical path and movable around the axis 103, 104 the front plane and the rear plane of the focal plane shutter, 105 the film, 106 the film pressing plate, 107 the pint glass, 108 the condensor lens, 109 the pentagonal prism, 110 the eye piece, 111 the light sensing member such as cds, SBC and the like arranged at a position at which the mean brightness of the total picture plane of the photographic field can be measured, 112 the connecting member being provided on the upper part of the view finder in the camera body so as to dismountably mount the partial light sensing member (II) on the camera body, 113 the condensor lens system, 114 the set lever for setting the difference ($Avo_1$) between the brightness of the photographic lens optical system 101 at the camera side and that of the condensor lens system 113 as well as the opening compensation amount ($Avc_1$) of the condensor lens system 113, 115 the diaphragm member for controlling the amount of the light beam from the photographic field in accordance with the set amount of the set lever 114 and 116 the light sensing member such as cds, SBC and the like for measuring the mean brightness at the central part of the photographic field. Hereby the optical system for indicating the light sensing member (view angle) of the outer light sensing unit (II) is omitted. 117 is the diaphragm member for varying the view angle, 118 the view angle varying lever for varying the opening angle of the diaphragm member 117, 119 the resistance being in functional engagement of the diaphragm member 117 and asserming the value in accordance with the varied amount of the view angle so as to automatically compensate the exposure level error when the view angle is varied. First of all in case photograph is taken while the brightness of the photographic field is measured with partial measurement, the partial light sensing member shown with (II) in FIG. 5 is mounted on the connection member 112 provided on the camera body while the switching over switch 122 is set at the opposite side to that shown in FIG. 4. In this way, the output of the partial light sensing member is put in the input terminal of the processing amplifier $A_3$. Further when photograph is taken while the mean brightness of the photographic field is measured, only the mean light sensing member shown with (I) in FIG. 5 is used, whereby the switching over switch 122 is set as is shown in FIG. 4. Hereby the photograph is taken by means of the partial light sensing member (II). After as mentioned above the partial light sensing member (II) is mounted on the camera body, the set lever 114 is slided either along the direction A or along the direction B so as to set the $Avo_1$ as well as the opening compensation amount ($Avc_1$). In case it is desired to alter the view angle, the view angle varying lever 118 is slided so as to set the view angle at the desired value. When then the shutter release button is pushed down, the switch $S_1$ is closed in such a manner that the light measuring circuit is brought into the operation state. Thus the potential at the output terminal of the amplifier 120 of the light measuring circuit assumes the value $Bv-(Avo_1+Avc_1)$ whereby the brightness of the object to be photographed is Bv. In consequence to the input terminal of the processing amplifier $A_3$ the output voltage $\{Bv-(Avo_1+Avc_1)\}$ of the processing amplifier 120 and the output voltage $(Sv-Tv+Avc)$ of the processing amplifier $A_2$ are put in so that at the output terminal of the amplifier $A_3$ the voltage corresponding to $\{Bv+Sv-Tv-Avo_1-(Avc_1-Avc)\}$, namely $(|Av|-Avo_1-Avc_1+Avc)$, in other wards the voltage corresponding to the number of the steps with which the diaphragm is to be closed from the fully opened state, is produced in such a manner that this diaphragm information is stored in the condensor $C_1$ through the switch $S_3$.

As explained above, on the camera body the mean light sensing element is provided while the partial light sensing element is provided outside of the camera body so that the arrangement of the light sensing elements is easy, especially the pentagonal prism can be manufactured easily while the light measuring part for partial measurement can be mounted and dismounted easily so that the construction becomes compact.

In the above mentioned embodiment the light sensing element provided at the camera side is for mean measurement while the light sensing element outside of the camera body is for partial measurement, whereby even if the arrangement is inversed, the effect of the present invention is not influenced.

What is claimed is:

1. A camera which permits change-over between different light measuring systems, said camera comprising:

a camera body provided with:
(a) a first light receiving element which measures light coming from an object to be photographed;
(b) a first light measurement operational amplifier which has said first light receiving element connected between the input terminals thereof, said first light measurement operational amplifier being arranged to produce an electrical signal corresponding to the output of said first light receiving element;
(c) a light measurement information producing circuit which produces a light measurement information signal for exposure computation; and
(d) change-over means connected between said light measurement information producing circuit and said first light measurement operational amplifier, said change-over means being arranged to be shiftable between a first position thereof in which said change-over means connects said first light measurement operational amplifier to said light measurement information producing circuit and a second position in which said change-over means does not connect said first light measurement operational amplifier to said light measurement information producing circuit, said electrical signal from said first light measurement operational amplifier being applied to said light measurement information producing circuit when said change-over means is shifted to said first position thereof; and an accessory device which is attachable to said camera body, said accessory device being provided with:
(a) a second light receiving element which measures light from the object within a light measurement range different from that of said first light receiving element;
(b) a second light measurement operational amplifier which has said second light receiving element connected between the input terminals thereof, said second light measurement operational amplifier being arranged to produce an electrical signal corresponding to the output of said second light receiving element; and
(c) a terminal to which said electrical signal from said second light measurement operational amplifier is applied, said terminal being disposed at said second position of said change-over means and being arranged to have said electrical signal from said second light measurement operational amplifier applied to said light measurement information producing circuit when said change-over means is shifted to said second position thereof.

2. A camera according to claim 1, wherein said first light receiving element measures light coming from the whole of said object and said second light receiving element measures light coming from a part of said object.

3. A camera according to claim 1, wherein said light measurement information producing circuit is provided with an amplifier for temperature compensation and a resistor for temperature compensation, said change-over means causing said electrical signal of either said first or second light measurement operational amplifier to be supplied through said temperature compensating resistor to said temperature compensating amplifier; and a light measurement information signal is produced from the output terminal of said temperature compensating amplifier when said electrical signal is supplied thereto.

4. A camera which permits change-over between different light measuring systems, said camera comprising:
- a photograph taking lens;
- a first light receiving element which measures light transmitted by said photograph taking lens;
- a first light measurement operational amplifier which has said first light receiving element connected between the input terminals thereof;
- a condenser lens for light measurement;
- a light quantity adjustment member which adjusts the quantity of light coming from an object to be photographed and coming through said condenser lens;
- a second light receiving element which measures light coming through said condenser lens and said light quantity adjustment member, the light measurement range of said second light receiving element being different from that of said first light receiving element;
- a second light measurement operational amplifier having said second light receiving element connected between the input terminals thereof, said second light measurement operational amplifier being arranged to produce an electrical signal corresponding to the output of said second light receiving element;
- a light measurement information producing circuit which produces a light measurement information signal for exposure computation; and
- change-over means which applies the output of either said first or second light measurement operational amplifier to said light measurement information producing circuit, said change-over means being shiftable between a first position thereof in which said change-over means connects said first light measurement operational amplifier to said light measurement information producing circuit and a second position thereof in which said change-over means connects said second light measurement operational amplifier to said light measurement information producing circuit.

* * * * *